(12) United States Patent
Bujard (10) Patent No.: US 8,916,236 B2
(45) Date of Patent: Dec. 23, 2014

(54) METHOD OF FORMING A (RUTILE) TITANIUM DIOXIDE-COATED PLATELET-LIKE PIGMENT

(75) Inventor: Patrice Bujard, Courtepin (CH)

(73) Assignee: Ciba Corporation, Tarrytown, NY (US)

( * ) Notice: Subject to any disclaimer, the term of this patent is extended or adjusted under 35 U.S.C. 154(b) by 1173 days.

(21) Appl. No.: 12/527,440

(22) PCT Filed: Feb. 18, 2008

(86) PCT No.: PCT/EP2008/051910
§ 371 (c)(1),
(2), (4) Date: Aug. 17, 2009

(87) PCT Pub. No.: WO2008/104467
PCT Pub. Date: Sep. 4, 2008

(65) Prior Publication Data
US 2010/0075031 A1    Mar. 25, 2010

(30) Foreign Application Priority Data

Feb. 27, 2007 (EP) .................................. 07103135
Mar. 13, 2007 (EP) .................................. 07104054

(51) Int. Cl.
| | | |
|---|---|---|
| B05D 7/00 | (2006.01) | |
| C09C 1/00 | (2006.01) | |
| C01G 23/053 | (2006.01) | |
| C09C 1/36 | (2006.01) | |

(52) U.S. Cl.
CPC ............ *C09C 1/0021* (2013.01); *C01G 23/053* (2013.01); *C01G 23/0536* (2013.01); *C09C 1/0024* (2013.01); *C09C 1/36* (2013.01); *C01P 2002/72* (2013.01); *C01P 2004/20* (2013.01); *C01P 2004/84* (2013.01); *C01P 2006/12* (2013.01); *C01P 2006/60* (2013.01); *C09C 2200/1004* (2013.01); *C09C 2200/102* (2013.01); *C09C 2200/50* (2013.01); *C09C 2220/106* (2013.01)

USPC ............................ 427/218; 106/436; 423/610

(58) Field of Classification Search
USPC .......... 427/212, 217, 218, 215; 423/610–616; 106/415, 416, 417, 436
See application file for complete search history.

(56) References Cited

U.S. PATENT DOCUMENTS 3,087,827 A * 4/1963 Klenke, Jr. et al. ............ 106/417
3,087,828 A   4/1963 Linton
(Continued)

FOREIGN PATENT DOCUMENTS

DE      1165182       3/1964
DE      19502231 A1 * 8/1995
(Continued)

OTHER PUBLICATIONS

Derwent abstract for JP 5903364 1984.*
(Continued)

*Primary Examiner* — John Goff
(74) *Attorney, Agent, or Firm* — Shruti Costales (57) ABSTRACT

The invention relates to a method of forming (rutile) titanium dioxide-coated platelet-like pigments in which hydrous titanium dioxide is deposited on platelet-like particles followed by calcining, comprising (a) effecting the titanium deposit in the presence of an α-hydroxy carboxylic acid, especially glycolic acid, or oxalic acid, and an amino acid, especially glycine, alanine, valine, aspartic acid (α-, β- and γ-form); or an amino acid; to the pigments obtained by the method and the use thereof. The method can work in the absence of exogenous metal and Ti(III). The rutile $TiO_2$-coated substrate of the present invention has at least the same advantages and characteristics of a tin containing product which includes luster, color, color homogeneity and few small particle formation during manufacture.

5 Claims, 2 Drawing Sheets

X-ray diffraction spectrum of the $Al_2O_3$ flakes obtained according to Example 1 of the present application comprising a rutile $TiO_2$ coating

(56) References Cited

U.S. PATENT DOCUMENTS

| | | |
|---|---|---|
| 3,107,173 A | 10/1963 | Klenke, Jr. et al. |
| 3,418,146 A | 12/1968 | Rieger et al. |
| 3,437,515 A | 4/1969 | Quinn et al. |
| 4,038,099 A | 7/1977 | DeLuca, Jr. et al. |
| 4,076,551 A | 2/1978 | Bernhard et al. |
| 4,086,100 A | 4/1978 | Esselborn et al. |
| 5,221,341 A | 6/1993 | Franz et al. |
| 5,433,779 A | 7/1995 | Deluca |
| 5,702,518 A | 12/1997 | Vogt et al. |
| 5,753,024 A | 5/1998 | Vogt et al. |
| 5,827,361 A | 10/1998 | Bernhardt et al. |
| 6,056,815 A | 5/2000 | Fu |
| 6,936,348 B1 | 8/2005 | Yanagase |
| 7,604,862 B2 | 10/2009 | Ambrosius et al. |
| 2002/0104461 A1 | 8/2002 | Schmidt |
| 2006/0188432 A1 | 8/2006 | Shio |
| 2006/0233697 A1* | 10/2006 | Zhou et al. .................... 423/610 |
| 2007/0015012 A1* | 1/2007 | Bujard et al. ............. 428/845.1 |

FOREIGN PATENT DOCUMENTS

| | | |
|---|---|---|
| EP | 0675175 | 10/1995 |
| EP | 0750021 | 12/1996 |
| EP | 1616840 A | 1/2006 |
| GB | 2268504 | 1/1994 |
| JP | 59033364 A * | 2/1984 |
| JP | 5-186705 | 7/1993 |
| JP | 2005-502738 | 1/2005 |
| WO | 2004104109 | 12/2004 |

OTHER PUBLICATIONS

English translation of JP 59033364 date unknown.*
Patent Abstracts of Japan 59033364, 1984.

* cited by examiner

Fig. 1

X-ray diffraction spectrum of the $Al_2O_3$ flakes obtained according to Example 1 of the present application comprising a rutile $TiO_2$ coating

Fig. 2

X-ray diffraction spectrum of the $Al_2O_3$ flakes obtained according to Comparative Example 2 of the present application comprising an anastase $TiO_2$ coating

METHOD OF FORMING A (RUTILE) TITANIUM DIOXIDE-COATED PLATELET-LIKE PIGMENT

The invention relates to a method of forming a (rutile) titanium dioxide-coated platelet-like pigment in the absence of exogenous metal and Ti(III), to the pigments obtained by the method and the use thereof.

DE1165182 describes a process for coating metal oxide coated mica pigments with a thin carbon film, wherein the thin carbon film is obtained by pyrolysis of hydrocarbons in the absence of oxygen.

DE19502231 discloses effect pigments with dark body colour which are based on a lamellar substrate, having (a) 1 or more coatings, in which case the outermost coating contains $TiO_2$ and C black, or (b) 2 or more coatings, in which case the outermost contains $TiO_2$ and the next contains C black. The pigment is obtained by mixing the metal oxide-coated substrate and C black without liquid medium, using a high-speed stirrer, suspending the coated substrate in aqueous medium and depositing an outermost layer of Ti oxide and subjecting the coated substrate to a reduction reaction at 500-1000° C. under inert gas conditions.

U.S. Pat. No. 4,076,551 discloses a process for the preparation of carbon black-containing pigments which consists essentially of precipitation of a carbon black-containing metal hydroxide or bismuth oxychloride layer on substrate particles in an aqueous suspension containing carbon black particles of particle size of below 1 mn. and washing, drying and optionally calcining the products.

GB2268504 describes a pigment having improved abrasion resistance, comprising a platelet-like substrate coated with carbon black, characterised in that the film containing carbon black is fixed by means of an anionic or cationic surfactant and a nonionic surfactant and an organofunctional silane compound.

EP675175 discloses carbonaceous pigments which are obtainable by pyrolysis of substrates coated with one or more metal oxides and colloidal organic particles, and opt. with an organosilane, at temperatures above 700° C. in the absence of oxygen. The pigments are produced by a process, comprising adding a hydrolysable metal salt solution and an aqueous organic colloid solution simultaneously but separately to an aqueous substrate suspension while adding a base or acid to adjust the pH to a value at which the metal salt is hydrolysed; optionally adding an organosilane and/or an aqueous organic colloid solution; separating, washing and drying the coated substrate; and calcining the substrate at a temperature above 700° C. in the absence of oxygen. Examples of the colloidal organic particles are starch, cellulose, gelatin or derivatives thereof.

U.S. Pat. No. 5,753,024 relates to grey pigments (I) containing Sn, which are obtained by pyrolysis of substrates coated with $SnO_2$ and other metal oxide(s) and colloidal organic particles (II) at 900-1100° C. with the exclusion of oxygen. Examples of the colloidal organic particles are starch, cellulose, gelatin, dextrin or a derivative of starch, cellulose, gelatin or dextrin.

EP750021 discloses gold pigments based on metal oxide-coated substrates, comprising multi-layer coatings of (A) titanium dioxide doped with carbon obtained by thermal degradation of organic colloidal particles, followed by (B) an iron (III) oxide layer. Examples of the colloidal organic particles are starch, cellulose, gelatin or dextrine particles.

WO2004104109 relates to a platy pigment substrate having a carbon-containing coating thereon wherein the coating comprises a pyrolyzed carbon-containing ionic species.

Pearlescent pigments are used extensively in a variety of applications including plastic incorporation, automotive coatings and in cosmetics. The pearlescent pigments which are titanium dioxide coated on a mica substrate have a high index of refraction. The pigments are normally dispersed in mediums such as paint films, or nail enamel films which, when fully cured, have an index of refraction of about 1.5. The index of refraction of the pearlescent pigment must therefore be considerably higher than 1.5 if reflectivity of light is to occur. This high index of refraction is provided by the titanium dioxide layer whose index can vary between about 2.4 and 2.7. The rutile form of titanium dioxide has a higher index than the anatase form and as a result, the rutile modification will have greater reflectivity than the anatase form. Therefore, the rutile modification of titanium dioxide in a pearlescent pigment is more desirable than the anatase modification.

There are many other reasons for preferring the rutile modification. The rutile modification is more stable in outdoor weathering than is the anatase modification. The rutile modification of a titanium dioxide coated substrate results in a product which has better luster and reflectivity, better color and color homogeneity and also contains fewer small particles. In the processing stage during the formation of the titanium dioxide on the substrate, particles which are not attached to the substrate may form. These small particles, which resemble pigmentary $TiO_2$, cause light scattering. If too many small particles are present, the pearlescent appearance may be lost or diminished. The process for coating substrate in the rutile crystalline form results in very few small particles compared to the anatase form.

The formation of pigmentary $TiO_2$ in the rutile form is known. In most reported cases, the primary concern is the formation of the rutile structure since coatings are not made on a substrate such as mica. Other considerations which are of primary importance in the formation of high quality pearlescent pigments which include the maintenance of extremely smooth surfaces, uniformity of thickness and color homogeneity are not pertinent.

In contrast to the formation of pigmentary $TiO_2$, mica is, as well known, anatase directing. Thus, if mica is coated with a layer of hydrous titanium dioxide and then subjected to the normal processing methods which include washing, drying and calcining usually from 750° C. to 900° C., the titanium dioxide which is formed is in the anatase form. The presence of the mica causes the $TiO_2$ to orient in the anatase crystalline form. Such pigments have been described for example in U.S. Pat. Nos. 3,437,515, 3,418,146 and 3,087,828.

If a rutile crystalline form is desired, the use of additives has been required. Most often, a layer of hydrous tin oxide is first precipitated on the surface of the mica followed by a layer of hydrous titanium dioxide. When this layered combination is processed and calcined, the titanium dioxide is oriented in the rutile form. This is described in detail in U.S. Pat. No. 4,038,099 and also U.S. Pat. No. 4,086,100. Other methods of forming rutile $TiO_2$ on mica substrates using tin oxide are also described.

Although many additives can aid in the formation of rutile $TiO_2$ per se, the formation of rutile $TiO_2$ on mica requires a very special additive. The coating of $TiO_2$ on the mica must be smooth and uniform. If an irregular surface is formed, light scattering takes place and the pigment no longer functions as a pearlescent pigment. The coating of $TiO_2$ must also adhere strongly to the mica or else the coating of $TiO_2$ will be separated from the mica during processing, resulting in considerable breakage and loss of luster. It is also necessary that the luster, color and color homogeneity be maintained. Small particle formation must be suppressed. Otherwise, the small particles will scatter light and diminish the pearlescent luster as was mentioned previously. An additive which is used must therefore perform many functions besides being a rutile crystalline director. It has been difficult to find an additive (other than tin) which can orient the $TiO_2$ to the rutile modification while still maintaining quality and all of the other desirable characteristics.

U.S. Pat. No. 5,433,779 teaches that if a small concentration of Fe and one or more of Zn, Ca and Mg ions are introduced into the coating prior to the start of the precipitation of hydrous titanium dioxide on mica, the precipitation proceeds as if a layer of hydrous tin oxide had been added. Complete rutile formation is achieved.

U.S. Pat. No. 6,056,815 teaches a process of making rutile titanium dioxide coated mica by first coating the mica platelet substrate with a titanium initiating layer by precipitating a Ti(III)salt solution in the presence of a constantly agitated platelet suspension. The precipitation is preferably accomplished by adjusting the pH to about 2-3, preferably about 2.4-2.8. A pH significantly lower than 2 results in a coating with an anatase structure or, at best, a mixture of anatase and rutile, while a pH significantly higher than 3 is likely to cause agglomeration. Thereafter, hydrous titanium dioxide is precipitated on the Ti(III) layer from a titanium tetrachloride bath. This process requires the use of a Ti(III) compound that is very expensive, sensitive and difficult to handle. The hydrolysis of $TiCl_3$, for example, has to be strictly controlled under an inert atmosphere to prevent oxidation and pH control during the $TiCl_3$ hydrolysis is critical, and additionally because of these considerations, the commencement of the $TiCl_4$ addition must be done under an inert atmosphere as well.

U.S. Pat. No. 6,936,348 discloses a method of depositing rutile type titanium dioxide comprising optionally attaching at least one member selected from the group consisting of platinum, a platinum compound, palladium and a palladium compound to a substrate and then depositing rutile type crystals on the substrate by a neutralization reaction from a titanium-containing solution having a temperature of 55 to 85° C. and a pH of not more than 1.3.

Thus, while there are additives other than tin for forming the rutile modification of titanium dioxide on a substrate such as mica while still maintaining all other desirable characteristics, the use of tin oxide is the most prevalent method used to make in commercial rutile titanium dioxide coated micas.

There are, however, two major disadvantages to the use of tin to make rutile $TiO_2$ coated substrates such as mica. The first is that tin oxide is not permitted in polymer compositions which are to be used in contact with food. Thus, any high quality pearlescent or interference pigment which contains tin oxide cannot be used to color the polymer film. The second is that in some countries, the presence of tin oxide may not be permitted in cosmetic products. Cosmetic manufacturers are therefore faced with a choice of either formulating cosmetic products destined for such countries with anatase only products and having a second line of the same products for the rest of the world formulated with rutile products or having a single anatase product line for the entire world. The result is that polymer formulations in contact with food and cosmetic lines to be used worldwide use anatase products even though the rutile $TiO_2$-coated products have better color, color homogeneity and luster.

According to JP59033364 flake mica particles, titanium tetrachloride, and polybasic organic acids or hydroxypolybasic organic acids are mixed by heating in an aqueous medium to deposit on the surface of mica particles a hydrous titanium salt of organic acid in thin films, or the obtained particles are burnt to dehydrate, thermally decompose, and oxidize said titanium salt. Polybasic organic acids or hydroxypolybasic organic acids to be used are those which form titanium salts of org. acids by reacting with titanates in an aqueous solution., and they include oxalic acid, malic acid, tartaric acid, citric acid, and their derivatives. Variations in conditions of burning mica through hydrous titanium salt of organic acid pigments permit selective preparation of either anatase or rutile titanium oxide. The method described in JP59033364 has the disadvantage that the coating of $TiO_2$ on the mica is not smooth and uniform enough.

It is therefore one object of this invention to improve the quality of the $TiO_2$ coating. A further object of this invention is to provide a pearlescent pigment of a titanium dioxide coated substrate in which the titanium dioxide is in the rutile crystalline form and in which tin, or another additive has not been used to promote rutilization, which has at least the same advantages and characteristics of the tin containing product which includes luster, color, color homogeneity and few small particle formation during manufacture. These and other objects of the invention will become apparent to one of ordinary skill in this art from the following detailed description.

Surprisingly, when the $TiO_2$ precursor comprises an amino acid the quality of the $TiO_2$ coating is improved. The amino acid affects the size of the titanium oxide particles, which agglomerate on the surface of the substrate leading to a layer featuring to interference colors. The agglomerate sizes depend on the choice of the amino acid and on the pH. A further improvement of the coating can be achieved in mixing amino acids and/or changing periodically the pH during the deposition. Changing periodically the pH is preferred and means varying the pH between a minimum (example 1.1) and a maximum value (example 2.3), linearly or stepwise. The period lies between 10 minutes to 2 hours, preferably 1 hour.

Examples of amino acids are alanine, phenylalanine, glycine, proline, cysteine, histidine, glutamine, aspartic acid, leucine, isoleucine, arginine, glutamic acid, lysine, serine, threonine, tryptophan, methionine, valine, tyrosine and asparagine. The at the moment most preferred amino acids are glycine, alanine, valine and aspartic acid ($\alpha$-, $\beta$- and $\gamma$-form).

When the $TiO_2$ precursor comprises in addition an $\alpha$-hydroxy carboxylic acid, such as glycolic acid, or oxalic acid, a layer of hydrous titanium dioxide precipitated on a substrate orients in the rutile form. The crystallisation of the rutile form of titanium dioxide is further improved after calcination above 500° C. to 1000° C., especially 600 to 800° C. under protecting atmosphere, such as argon, or in air.

When the calcination is done under vacuum and/or under a protecting atmosphere, such as argon, carbon is formed from the $\alpha$-hydroxy carboxylic acid and/or amino acid contained in the $TiO_2$ layer, which results in a carbon containing $TiO_2$ layer.

Accordingly, the present invention relates to a pigment, comprising
(A) platelet-like substrate, and
(C) a (rutile) titanium dioxide layer, which contains carbon.

The carbon incorporated within the $TiO_2$ layer acts as absorbing layer, wherein the carbon containing $TiO_2$ layer in general has a thickness of 5 to 50 nm, preferably 5 to 20 nm.

The pigment may comprise more than one carbon containing $TiO_2$ layers.

In a preferred embodiment of the present invention the pigments have the following layer structure: TRASUB/D/Y, TRASUB/Y/D, or TRASUB/Y/D/Y or TRASUB/D/Y/D, such as TRASUB/$TiO_2$/Y, TRASUB/Y/$TiO_2$, TRASUB/Y/

TiO$_2$/Y, or TRASUB/TiO$_2$/Y/TiO$_2$, wherein TRASUB is a transparent, or semitransparent substrate having a low index of refraction, especially natural, or synthetic mica, another layered silicate, glass, Al$_2$O$_3$, SiO$_z$, especially SiO$_2$, SiO$_2$/SiO$_x$/SiO$_2$ (0.03≤x≤0.95), SiO$_{1.40-2.0}$/SiO$_{0.70-0.99}$/SiO$_{1.40-2.0}$, or Si/SiO$_z$ with 0.70≤z≤2.0, especially 1.40≤z≤2.0, Y is a carbon containing TiO$_2$ layer and D is a metal oxide of low refractive index, such as SiO$_2$, Al$_2$O$_3$, AlOOH, B$_2$O$_3$ or a mixture thereof, preferably SiO$_2$, or a metal oxide of high refractive index, such as TiO$_2$, ZrO$_2$, Fe$_2$O$_3$, Fe$_3$O$_4$, Cr$_2$O$_3$, ZnO or a mixture of these oxides, preferably (rutile) TiO$_2$. The thickness of the layer D depends on the metal oxide used and is, in general, 20 to 600 nm.

In another preferred embodiment of the present invention the pigments have the following layer structure: M/X/Y, such as Al (50-1000 nm)/X (100-600 nm)/Y (5-50 nm), wherein M is Ag, Al, Au, Cu, Cr, Fe, Ge, Mo, Ni, Si, Ti, or alloys thereof, such as brass or steel, preferably Al, Y is a carbon containing TiO$_2$ layer and X is SiO$_z$, wherein 0.70≤z≤2.0, preferably 1.0≤z≤2.0, most preferably 1.4≤z≤2.0. The thickness of the metal layer (substrate) is in the range between 50 and 1000 nm, preferably 50 to 200 nm.

The carbon containing TiO$_2$ layer is obtained by precipitating the TiO$_2$ in the presence of an α-hydroxy carboxylic acid and/or amino acid, wherein part of the organic material is trapped within the TiO$_2$ coating. After calcination under vacuum and/or under a protecting atmosphere, such as argon, at 300 to 800° C., especially 600 to 800° C. carbon is formed from the α-hydroxy carboxylic acid and/or amino acid contained in the TiO$_2$ layer.

Accordingly, the present invention relates to a method of forming a (rutile) titanium dioxide-coated platelet-like pigment in which hydrous titanium dioxide is deposited on platelet-like particles (followed by calcining), comprising (a) effecting the titanium deposit in the presence of an α-hydroxy carboxylic acid, especially glycolic acid, or oxalic acid, and an amino acid, especially glycine, alanine, valine, aspartic acid (α-, β- and γ-form) and in the absence of tin; or in the presence of an amino acid.

The wording "in the presence of an α-hydroxy carboxylic acid and an amino acid" does not only comprise the simultaneous presence of the α-hydroxy carboxylic acid and the amino acid, but also the subsequent presence of the α-hydroxy carboxylic acid and the amino acid that is, TiO$_2$ may, for example, be first precipitated in the presence of the α-hydroxy carboxylic acid and then in the presence of the amino acid.

In one embodiment the method of the present invention comprises, in sequence, (a) contacting the platelet-like particles with a titanium salt and an an amino acid containing coating bath at a low pH and coating the platelet-like particles with titanium dioxide in the hydrous form at acid pH by deposition from the titanium salt containing coating bath at a low pH.

The pH in step (a) is preferably from 1.2 to 2.5.

After the deposition of the TiO$_2$ layer (b) the titanium dioxide coated particles are removed from the coating bath and washed to remove excess acid and impurities therefrom; and (c) calcined at a temperature above 500 to 1000° C., especially 600 to 800° C., to produce a translucent coating of titanium dioxide in the rutile crystalline form thereon.

An aqueous titanium salt solution is slowly added to a suspension of the material being coated, which suspension has been heated to about 50-100° C., especially 70-90° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated TiO$_2$ has been achieved, the addition of titanium salt solution and base is stopped. Addition of a precursor for Al$_2$O$_3$ or MgO in the starting solutions is a way for improving the morphology of the TiO$_2$ layer.

In principle, the anatase form of TiO$_2$ forms on the surface of the starting pigment. By adding small amounts of SnO$_2$, however, it is possible to force the rutile structure to be formed. For example, as described in WO 93/08237, tin dioxide can be deposited before titanium dioxide precipitation and the product coated with titanium dioxide can be calcined at from 700 to 900° C. Optionally, the deposition of the SnO$_2$ can be done in the presence of an amino acid.

In an especially preferred embodiment of the present invention the substrate flakes are mixed with distilled water in a closed reactor and heated at about 90° C. The pH is set to about 1.8 to 2.2 and a preparation comprising TiOCl$_2$, HCl, glycine and distilled water is added slowly while keeping the pH constant (1.8 to 2.2) by continuous addition of 1M NaOH solution. By adding an amino acid, such as glycine, during the deposition of the TiO$_2$ the quality of the TiO$_2$ coating to be formed is improved. Advantageously, a preparation comprising TiOCl$_2$, HCl, and glycine and distilled water is added to the substrate flakes in water.

In another embodiment of the present invention a pearlescent pigment which comprises platelet-like particles having an adherent layer of rutile titanium dioxide and which does not contain tin as a rutile promoter is achieved by precipitating the hydrous titanium dioxide on the platelet-like particles in the presence of α-hydroxy carboxylic acid and an amino acid. The procedure is generally the same as that employed to form tin-containing rutile TiO$_2$-coated mica with the exception that no tin is employed and the precipitation is done in the presence of α-hydroxy carboxylic acid and an amino acid. The α-hydroxy carboxylic acid is used to generate the rutile phase. The amino acid is used to improve the quality of the TiO$_2$-coating.

Examples of α-hydroxy carboxylic acids which can advantageously be used in the method of the present invention are: benzilic acid, 1-hydroxycyclopentane carboxylic acid, lactic acid, phenylglycolic acid (mandelic acid), citric acid, tartaric acid, hydroxysuccinic acid, salicic acid, especially glycolic acid, or oxalic acid.

The rutile TiO$_2$-coated substrate of the present invention has at least the same advantages and characteristics of a tin containing product which includes luster, color, color homogeneity and few small particle formation during manufacture.

In said embodiment the method of the present invention comprises, in sequence and in the absence of exogenous metal and Ti(III), (a) contacting the platelet-like particles with a titanium salt and an α-hydroxy carboxylic acid and an amino acid containing coating bath at a low pH and coating the platelet-like particles with titanium dioxide in the hydrous form at acid pH by deposition from the titanium salt containing coating bath at a low pH.

The pH in step (a) is preferably from 1.2 to 2.5.

After the deposition of the $TiO_2$ layer (b) the titanium dioxide coated particles are removed from the coating bath and washed to remove excess acid and impurities therefrom; and (c) calcined at a temperature above 500 to 1000° C., especially 600 to 800° C., to produce a translucent coating of titanium dioxide in the rutile crystalline form thereon.

The rutile titanium dioxide-coated platelet-like pigments are new and form a further subject of the present invention.

Accordingly, the present inventions is directed to a rutile titanium dioxide-coated platelet-like pigment, the pigment being free of metal or other rutile directing additive deposited on the particles.

In a preferred embodiment, the pigment comprises
(A) platelet-like substrate, and
(B) a rutile titanium dioxide layer, which contains carbon, or is a multilayer pigment, comprising
(A) a platelet-like substrate, and
(B) a rutile titanium dioxide layer, which contains carbon,
(C) a layer of a metal oxide of low refractive index, especially $SiO_2$, $Al_2O_3$, AlOOH, $B_2O_3$, or a mixture thereof, wherein alkali or earth alkali metal oxides can be contained as additional component, and
(D) a layer of a metal oxide of high refractive index, especially $TiO_2$, $ZrO_2$, $Fe_2O_3$, $Fe_3O_4$, $Cr_2O_3$, ZnO or a mixture of these oxides.

The rutile titanium dioxide layer, which contains carbon, is translucent. "Translucent" means that the layer does not feature light scattering. Any possible fluctuation of the intrinsic optical properties of the material (mainly the effective index of refraction) composing the layer is at a space scale below 10 times smaller than the shortest visible wavelength (380 nm).

Suitable platelet-shaped substrates are transparent, partially reflectant, or reflectant. Examples thereof are natural micaceous iron oxide (for example as in WO99/48634), synthetic and doped micaceous iron oxide (for example as in EP-A-068311), mica (biotite, vermiculite, sericite, muscovite, phlogopite, fluorophlogopite, kaolinite or related), or any synthetic mica, such as synthetic fluorophlogopite), basic lead carbonate, flaky barium sulfate, $MoS_2$, $SiO_2$, $Al_2O_3$, $TiO_2$, glass, ZnO, $ZrO_2$, $SnO_2$, BiOCl, chromium oxide, BN, MgO flakes, $Si_3N_4$, and graphite. Particularly preferred substrates are mica, $SiO_2$ flakes, $Al_2O_3$ flakes, $TiO_2$ flakes, and glass flakes.

Another preferred embodiment is the use of flat metallic particles as the core. Examples of suitable metallic particles are flakes of Ag, Al, Au, Cu, Cr, Fe, Ge, Mo, Ni, Si, Ti, or alloys thereof, such as brass or steel, preferably Al flakes. Depending on the material, a natural optically non-interfering oxide layer may form on the surface of metallic particle. Partially reflecting cores have preferably a reflectance of at least 35% of the light falling vertically on its surface in the range from 380 to 800 nm.

Additional examples of plateletlike substrates are platelet-like organic pigments, such as chinacridones, phthalocyanine, fluororubine, red perylenes or diketopyrrolopyrroles.

The process of the present invention is suitable for the formation of translucent rutile titanium dioxide-coated platelet-shaped substrates. The size of the core particles is not critical per se and can be adapted to the particular use. Generally, the particles have a length from about 1 to 200 µm, in particular from about 5 to 100 µm, and thicknesses from about 0.05 to 5 µm, preferably from 0.1 to 2 µm. Particles having a platelet-like shape are understood to be such having two essentially flat and parallel surfaces, with an aspect ratio length to thickness of from about 2:1 to about 1000:1, and a length to width ratio of from 3:1 to 1:1.

Preferred are platelet-like particles on basis of a transparent, or semitransparent substrate having a low index of refraction, especially natural, or synthetic mica, another layered silicate, glass, $Al_2O_3$, $SiO_2$, especially $SiO_2$, $SiO_2/SiO_x/SiO_2$ ($0.03 \le x \le 0.95$), $SiO_{1.40-2.0}/SiO_{0.70-0.99}/SiO_{1.40-2.0}$, or $Si/SiO_z$ with $0.70 \le z \le 2.0$, having on top of the substrate at least one translucent rutile titanium oxide layer. It is possible to obtain pigments that are more intense in colour and more transparent by applying, on top of the translucent rutile $TiO_2$ layer, a metal oxide of low refractive index, such as $SiO_2$, $Al_2O_3$, AlOOH, $B_2O_3$ or a mixture thereof, preferably $SiO_2$, and applying a further rutile $TiO_2$ layer on top of the latter layer (EP-A-892832, EP-A-753545, WO93/08237, WO98/53011, WO9812266, WO9838254, WO99/20695, WO00/42111, and EP-A-1213330).

Pigments having the following layer structure are especially preferred:

| | | | |
|---|---|---|---|
| TRASUB | $(SnO_2)Y$ | | |
| TRASUB | Y | | |
| TRASUB | $(SnO_2)Y$ | $SiO_2$ | $TiO_2$ |
| TRASUB | Y | $SiO_2$ | $TiO_2$ |
| TRASUB | $(SnO_2)Y$ | $SiO_2$ | $TiO_2/Fe_2O_3$ |
| TRASUB | Y | $SiO_2$ | $TiO_2/Fe_2O_3$ |
| TRASUB | $(Sn,Sb)O_2$ | $SiO_2$ | Y |
| TRASUB | $TiO_2/Fe_2O_3$ | $SiO_2$ | $(SnO_2)Y$ |
| TRASUB | $TiO_2/Fe_2O_3$ | $SiO_2$ | Y |
| TRASUB | $Cr_2O_3$ | $SiO_2$ | $(SnO_2)Y$ |
| TRASUB | $Cr_2O_3$ | $SiO_2$ | Y |
| TRASUB | $Fe_2O_3$ | $SiO_2$ | $(SnO_2)Y$ |
| TRASUB | $Fe_2O_3$ | $SiO_2$ | Y |
| TRASUB | TiO suboxides | $SiO_2$ | Y |
| TRASUB | $(SnO_2)Y$ | $SiO_2$ | TiO suboxides |
| TRASUB | Y | $SiO_2$ | TiO suboxides |
| TRASUB | $(SnO_2)Y$ | $SiO_2$ | $TiO_2 + SiO_2 + TiO_2$ |
| TRASUB | Y | $SiO_2$ | $TiO_2 + SiO_2 + TiO_2$ |
| TRASUB | $(SnO_2)Y + SiO_2 + TiO_2$ | $SiO_2$ | $TiO_2 + SiO_2 + TiO_2$ |
| TRASUB | $Y + SiO_2 + TiO_2$ | $SiO_2$ | $TiO_2 + SiO_2 + TiO_2$ |
| TRASUB | $(SnO_2)Y$ | $Al_2O_3$ | $TiO_2$ |
| TRASUB | Y | $Al_2O_3$ | $TiO_2$ |
| TRASUB | $TiO_2$ | $Al_2O_3$ | $(SnO_2)Y$ |
| TRASUB | $TiO_2$ | $Al_2O_3$ | Y |
| TRASUB | $Fe_2TiO_5$ | $SiO_2$ | $(SnO_2)Y$ |
| TRASUB | $Fe_2TiO_5$ | $SiO_2$ | Y |
| TRASUB | $(SnO_2)Y$ | $SiO_2$ | $Fe_2TiO_5/TiO_2$ |
| TRASUB | Y | $SiO_2$ | $Fe_2TiO_5/TiO_2$ |
| TRASUB | STL | Y | | wherein TRASUB is a transparent, or semitransparent substrate having a low index of refraction, especially natural, or synthetic mica, another layered silicate, glass, $Al_2O_3$, $SiO_2$, especially $SiO_2$, $SiO_2/SiO_x/SiO_2$ ($0.03 \le x \le 0.95$), $SiO_{1.40-2.0}/SiO_{0.70-0.99}/SiO_{1.40-2.0}$, or $Si/SiO_z$ with $0.70 \le z \le 2.0$, especially 1.40 ≤ z ≤ 2.0, Y is a carbon containing $TiO_2$ layer, and STL is a semi-transparent layer, such as, for example, a semi-transparent metal layer of Cu, Ag, Cr, or Sn, or a semitransparent carbon layer.

The plate-like substrate is preferably selected from mica, $SiO_2$ flakes, $Al_2O_3$ flakes, and glass flakes.

The process of the present invention is explained on the basis of $Al_2O_3$ as substrate, but is not limited thereto. $Al_2O_3$ flakes are, for example, described in U.S. Pat. No. 4,374,119; JP-B-03-72527, JP-A-04-39362, Eur. Coat. J., April, 1999, pp. 90-96, WO2004060804 and WO2006101306. It is possible, for example, to use the aluminium oxide (α-alumina) platelets described in WO2006101306, comprising aluminum oxide and zinc oxide as main constituents. Said flaky α-alumina crystal has a thickness of 0.04-0.5 µm, an average particle diameter of 15-25 µm and an aspect ratio of 50-250 (claim 3). Alternatively, the ultrafine plate-like alumina particles described in WO2004060804 can be used, which have an aspect ratio of width to diameter of between 1:10 and 1:100, a diameter between 0.1 to 30 microns.

The method described in U.S. Pat. No. 3,553,001 is preferably used, in accordance with an embodiment of the present invention, for the application of the rutile titanium dioxide layers. In the coating process the $Al_2O_3$ flakes are dispersed in water, which is preferably distilled. An aqueous titanium salt solution is slowly added to a suspension of the material being coated, which suspension has been heated to about 50-100° C., especially 70-90° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as the "titration method", is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated.

By adding an α-hydroxy carboxylic acid, such as glycolic acid, during the deposition of the $TiO_2$ it is possible to force the rutile structure to be formed. Advantageously, a preparation comprising $TiOCl_2$, HCl, and glycolic acid and distilled water is added to the substrate flakes in water.

By adding an amino acid, such as glycine, during the deposition of the $TiO_2$ it is possible to improve the quality of the $TiO_2$ coating to be formed. Advantageously, a preparation comprising $TiOCl_2$, HCl, and glycine and distilled water is added to the substrate flakes in water.

By adding an α-hydroxy carboxylic acid and an amino acid both effects may be achieved. While it is possible that the α-hydroxy carboxylic acid and the amino acid may be added simultaneously, or subsequently, it is at present preferred that first the preparation comprising the α-hydroxy carboxylic acid and then the preparation comprising the the amino acid is added.

The α-hydroxy carboxylic acid is added in an amount of 0.01 to 1 mol, especially 0.01 to 0.1 mol per mol titanium. The amino acid is added in an amount of 0.01 to 1 mol, especially 0.01 to 0.1 mol per mol titanium.

Preferably, the $Al_2O_3$ flakes are mixed with distilled water in a closed reactor and heated at about 90° C. The pH is set to about 2.2 and a preparation comprising $TiOCl_2$, HCl, glycolic acid and distilled water is added slowly while keeping the pH constant by continuous addition of 1M NaOH solution. The pH is set at 2.0 and a preparation comprising $TiOCl_2$, HCl, glycine and distilled water is added slowly while keeping the pH constant by continuous addition of 1M NaOH solution. Then the product is filtered, dried and calcinated at 600° C. under 3 mbar of argon.

Instead of $Al_2O_3$ flakes mica and glass flakes can be used as substrates. Although muscovite mica is the preferred mica because of its white color, other micas can be used which include phlogopite, lipidolite or synthetic micas. The average particle size of the mica which is used can vary from an average particle size of about 3 microns to an average particle size of about 100 microns. Suitable glass flakes (A glass, C glass, E glass, or ECR glass) have an average particle size in the range of 5-150 µm and a thickness of 0.1-2 µm. The aspect ratio of the glass flakes is in the range of 10-300, preferably in the range of 50-200.

The (effect) pigments according to the invention can be used for all customary purposes, for example for colouring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "High Performance Pigments" (H. M. Smith, Wiley VCH-Verlag GmbH, Weinheim, 2002), "Special effect pigments" (R. Glausch et al., Curt R. Vincentz Verlag, Hannover, 1998). When the pigments according to the invention are interference pigments (effect pigments), they may be goniochromatic and result in brilliant, highly saturated (lustrous) colours. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP-A-388 932 or EP-A-402 943, when the colour of the transparent pigment and that of the effect pigment are complementary.

Accordingly, the present invention is also directed to the use of the pigments of the present invention in paints, ink-jet printing, for dyeing textiles, for pigmenting coatings, printing inks, plastics, cosmetics, glazes for ceramics and glass and paints, printing inks, plastics, cosmetics, ceramics and glass, which are pigmented with a pigment according to the present invention.

The (effect) pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10°, a difference in hue ($\Delta H^*$) of from 20 to 340, especially from 150 to 210.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The effect pigments according to the invention are also suitable for making-up the lips or the skin and for colouring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

The cosmetic preparations and formulations according to the invention are prepared in conventional manner, for example by mixing or stirring the components together, optionally with heating so that the mixtures melt.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Comparative Example 1

Figure 1:
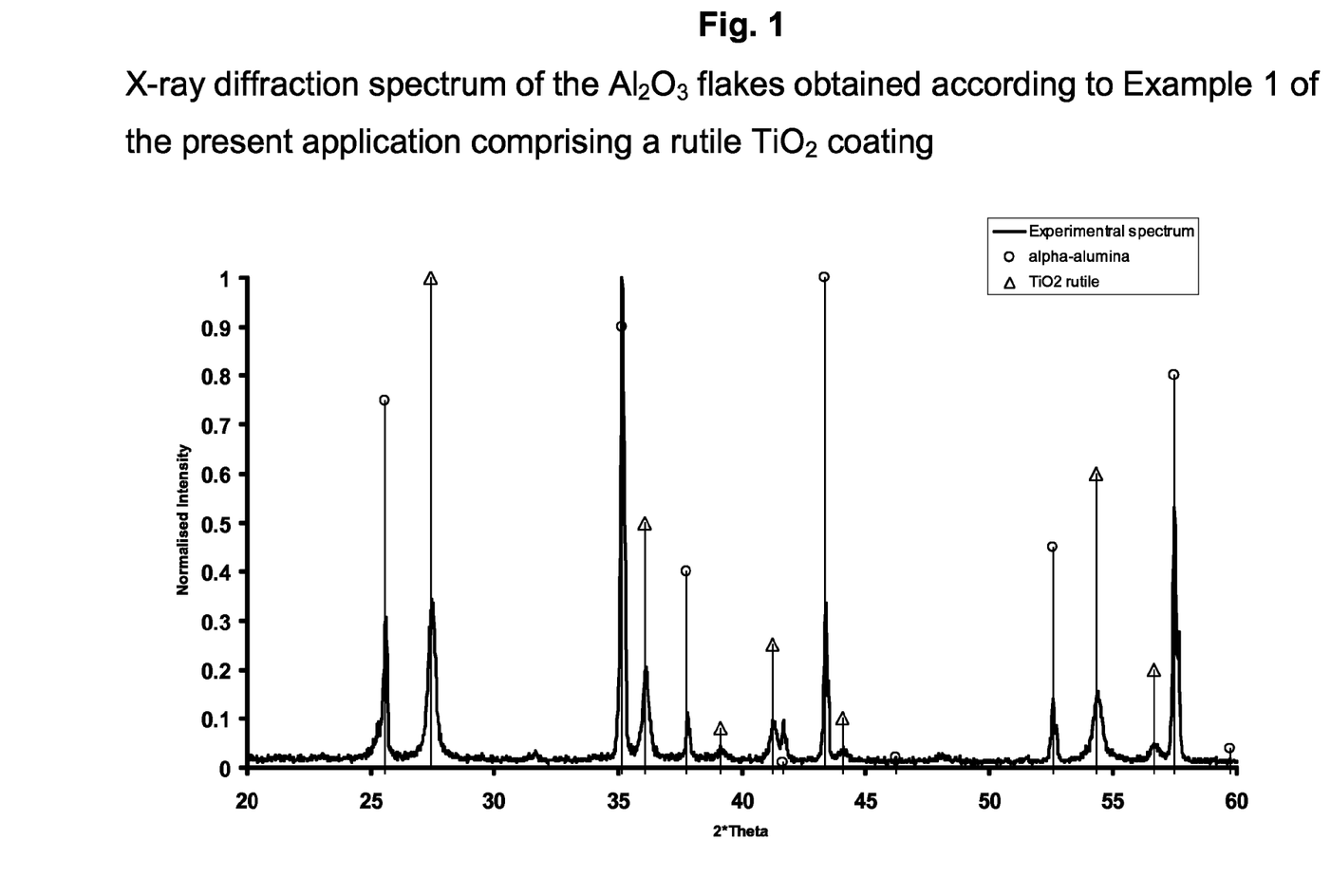
FIG. 1 represents an X-ray diffraction spectrum of the Al$_2$O$_3$ flakes obtained according to Comparative Example 1 of the present application comprising a rutile TiO$_2$ coating.

4.5 g of $Al_2O_3$ flakes (Advanced Nanotechnology, corundum; average thickness of about (360±100) nm and a BET of 1 $m^2/g$) are mixed with 300 ml distilled water in a closed reactor and heated at 90° C. The pH is set to 2.2 and the suspension is stirred at 400 rpm for 15 minutes. Then the pH is set to 2.2 and a preparation comprising 34 g of $TiOCl_2$, 32 g of 37% HCl, 5.11 g glycolic acid and 445 g distilled water is added at a rate of 0.8 ml/minutes during 6 hours while keeping the pH constant by continuous addition continuous of 1M NaOH solution. Then the product is filtered, dried and calcinated at 600° C. under 3 mbar of argon for 6 hours. X-ray diffraction spectroscopy shows that the $TiO_2$ is present in the rutile modification (see FIG. 1) and elemental analysis shows that the product contains 13% by weight of Ti. The powder shows a yellow orange colour in air.

Comparative Example 2

Figure 2:
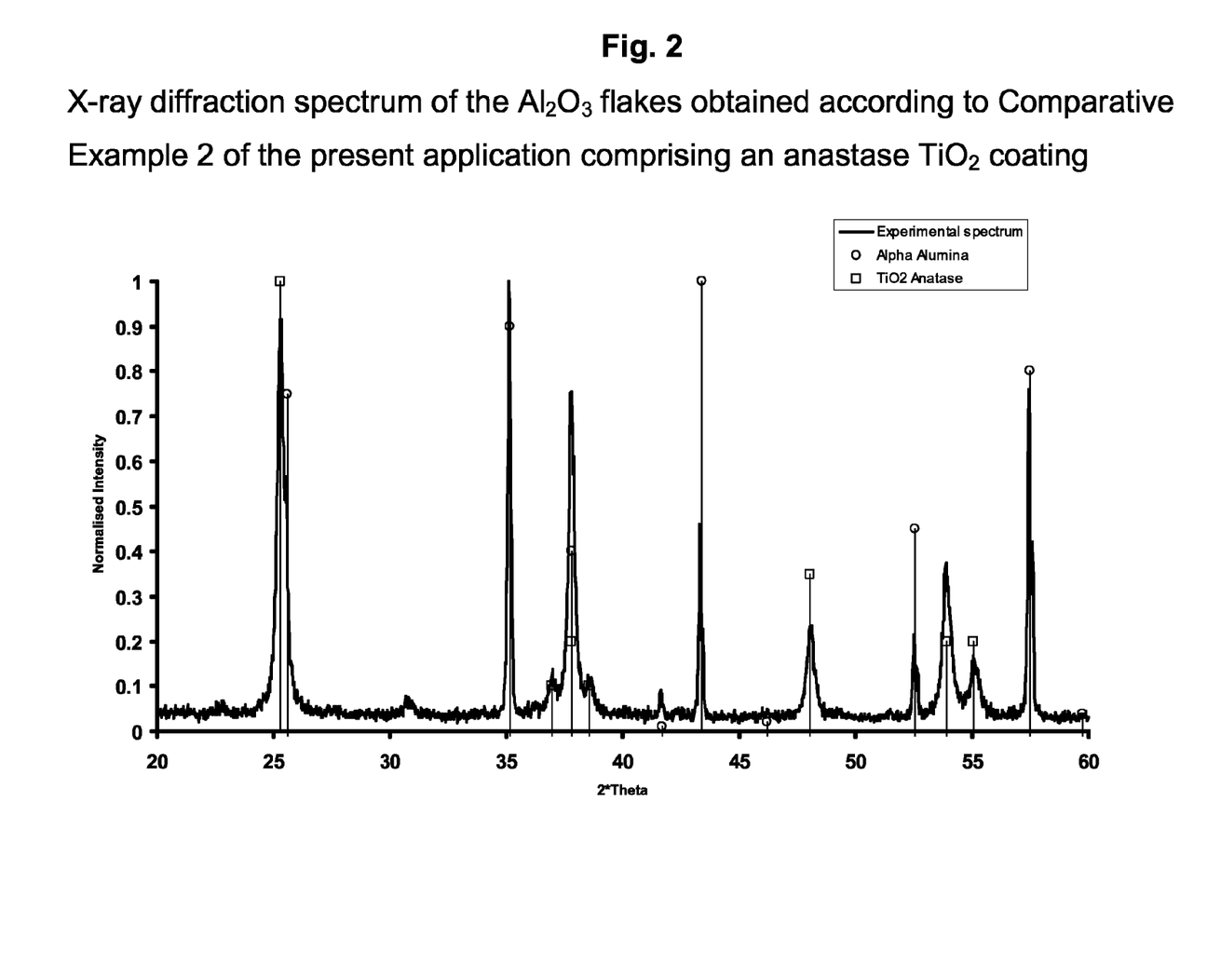
FIG. 2 represents an X-ray diffraction spectrum of the Al$_2$O$_3$ flakes obtained according to Comparative Example 2 of the present application comprising an anastase TiO$_2$ coating.

Example 1 is repeated, except that a preparation comprising 34 g of $TiOCl_2$, 32 g of 37% HCl and 445 g distilled water is present during the formation of the $TiO_2$ layer. X-ray diffraction spectroscopy shows that the $TiO_2$ is present in the anatase modification (see FIG. 2).

Example 1

12 g of $Al_2O_3$ flakes (Advanced Nanotechnology, corundum; average thickness of about (360±100) nm and a BET of 1 $m^2/g$) are mixed with 300 ml distilled water in a closed reactor and heated at 90° C. The pH is set to 2.0 and the suspension is stirred at 400 rpm for 15 minutes. Then the pH is set to 2.0 and a preparation comprising 34 g of $TiOCl_2$, 32 g of 37% HCl, 5.11 g glycine and 445 g distilled water is added at a rate of 0.4 ml/minutes during 16 hours while keeping the pH constant by continuous addition of 1M NaOH solution. The product is filtered, dried and calcinated at 700° C. under 3 mbar of air for 6 hours. X-ray diffraction spectroscopy shows that the $TiO_2$ is present in the rutile and anatase modification (see FIG. 3) and elemental analysis shows that the product contains 18.2% by weight of Ti. The powder shows a violet-purple color in air.

Example 2

12 g of $Al_2O_3$ flakes (Advanced Nanotechnology, corundum; average thickness of about (360±100) nm and a BET of 1 $m^2/g$) are mixed with 300 ml distilled water in a closed reactor and heated at 90° C. The pH is set to 2.2 and the suspension is stirred at 400 rpm for 15 minutes. Then the pH is maintain at 2.2 and a preparation comprising 34 g of $TiOCl_2$, 32 g of 37% HCl, 5.11 g glycolic acid and 445 g distilled water is added at a rate of 0.4 ml/minutes during 0.5 hour while keeping the pH constant by continuous addition of 1M NaOH solution. Then the pH is set at 2.0 and a preparation comprising 34 g of $TiOCl_2$, 32 g of 37% HCl, 5.11 g glycine and 445 g distilled water is added at a rate of 0.4 ml/minutes during 11 hour while keeping the pH constant by continuous addition of 1M NaOH solution. The product is filtered, dried and calcinated at 700° C. under 3 mbar of air for 6 hours. X-ray diffraction spectroscopy shows that the $TiO_2$ is present in the rutile modification (see FIG. 3) and elemental analysis shows that the product contains 12.2% by weight of Ti. The powder shows a yellow color in air. The presence of glycine helps to reduce the size of the $TiO_2$ clusters, which forms the $TiO_2$ layer. A smoother more uniform $TiO_2$ surface is obtained.

Example 3

12 g of Xymara® dual pearl D25 are mixed with 1.5 l distilled water in a closed reactor and heated at 90° C. The pH is set to 2.2 and the suspension is stirred at 400 rpm for 15 minutes. Then the pH is set to 2.2 and a preparation comprises 34 g of $TiOCl_2$, 32 g of 37% HCl, 10.2 g glycine and 445 g distilled water is added at a rate of 0.4 ml/minutes during 1 hour while keeping the pH constant by continuous addition of 1M NaOH solution.

Then the product is filtered, dried and calcinated at 600° C. under 3 mbar of argon for 1 hour. X-ray diffraction spectroscopy shows that the $TiO_2$ is present in the rutile modification. The powder shows a bright blue-green color in air. 0.8 g of the dry powder is mixed with 26.6 g polyvinyl chloride (PVC Evipol® SH 7020, EVC GmbH, Frankfurt a.M), and 14.6 ml of a masterbatch consisting of

- 92.21% by weight of diisodecyl phthalate (Vestinol®, Hüls Chemie)
- 3.60% by weight of heat stabilisers based on barium zinc carboxylate (Irgastab® BZ561, Ciba Specialty Chemicals Inc.) and
- 4.19% of epoxidised Soybean oil (Rheoplast® 39, Ciba Specialty Chemicals Inc.)

After a wetting time of 30 minutes, the mixture is processed on a roll mill for 8 minutes at a roll temperature of 160° C. to a PVC film having an intense blue-green color.

Example 4

12 g of Xymara® dual pearl D25 are mixed with 1.5 l distilled water in a closed reactor and heated at 90° C. The pH is set to 2.2 and the suspension is stirred at 400 rpm for 15 minutes. Then the pH is set to 2.2 and a preparation comprising 34 g of $TiOCl_2$, 32 g of 37% HCl, 5.11 g glycolic acid and 445 g distilled water is added at a rate of 0.4 ml/minutes during 1 hour while keeping the pH constant by continuous addition of 1M NaOH solution.

Then the product is filtered, dried and calcinated at 600° C. under 3 mbar of argon for 1 hour. X-ray diffraction spectroscopy shows that the $TiO_2$ is present in the rutile modification. The powder shows a bright blue-green color in air. 0.8 g of the dry powder is mixed with 26.6 g polyvinyl chloride (PVC Evipol® SH 7020, EVC GmbH, Frankfurt a.M), and 14.6 ml of a masterbatch consisting of

- 92.21% by weight of diisodecyl phthalate (Vestinol®, Hüls Chemie)
- 3.60% by weight of heat stabilisers based on barium zinc carboxylate (Irgastab® BZ561, Ciba Specialty Chemicals Inc.) and
- 4.19% of epoxidised Soybean oil (Rheoplast® 39, Ciba Specialty Chemicals Inc.)

After a wetting time of 30 minutes, the mixture is processed on a roll mill for 8 minutes at a roll temperature of 160° C. a PVC film having a bright blue-green color.

Example 5

12 g of Xymara® dual pearl D25 are mixed with 1.5 l distilled water in a closed reactor and heated at 90° C. The pH is set to 2.2 and the suspension is stirred at 400 rpm for 15 minutes. Then the pH is set to 2.2 and a preparation comprises 34 g of $TiOCl_2$, 32 g of 37% HCl, 10.2 g glycine and 445 g distilled water is added at a rate of 0.4 ml/minutes during 1 hour while keeping the pH constant by continuous addition of 1M NaOH solution.

Then the product is filtered, dried and calcinated at 600° C. under 3 mbar of argon for 1 hour. X-ray diffraction spectroscopy shows that the $TiO_2$ is present in the rutile modification. The powder shows a bright blue-green color in air. 0.8 g of the dry powder is mixed with 26.6 g polyvinyl chloride (PVC Evipol® SH 7020, EVC GmbH, Frankfurt a.M), and 14.6 ml of a masterbatch consisting of

- 92.21% by weight of diisodecyl phthalate (Vestinol®, Hüls Chemie)
- 3.60% by weight of heat stabilisers based on barium zinc carboxylate (Irgastab® BZ561, Ciba Specialty Chemicals Inc.) and
- 4.19% of epoxidised Soybean oil (Rheoplast® 39, Ciba Specialty Chemicals Inc.)

After a wetting time of 30 minutes, the mixture is processed on a roll mill for 8 minutes at a roll temperature of 160° C. to a PVC film having an intense blue-green color.

Example 6

12 g of $Al_2O_3$ flakes (Advanced Nanotechnology, corundum; average thickness of about (360±100) nm and a BET of 1 $m^2/g$) are mixed with 300 ml distilled water and heated at 90° C. The pH is set to 2.0 and the suspension is stirred at 400 rpm. Then the pH is maintain at 2.0 and a preparation comprising 34 g of $TiOCl_2$, 32 g of 37% HCl, 5.11 g glycolic acid, 5.11 g glycine and 445 g distilled water is added at a rate of 0.4 ml/minutes during 7.5 hours while keeping the pH constant by continuous addition of 1M NaOH solution.

The product is filtered, dried and calcinated at 700° C. under Ar for 2 hours. X-ray diffraction spectroscopy shows that the $TiO_2$ is present in the rutile modification and elemental analysis shows that the product contains 11.7% by weight of Ti. The powder shows a silver-like color in air.

Example 7

12 g of $Al_2O_3$ flakes (Advanced Nanotechnology, corundum; average thickness of about (360±100) nm and a BET of 1 $m^2/g$) are mixed with 480 ml distilled water. The suspension is driven in a microwave oven in closed loop at 600 ml/min. The pH is set to 1.8 and a preparation comprising 34 g of $TiOCl_2$, 32 g of 37% HCl, 5.11 g glycine and 445 g distilled water is added at a rate of 4 ml/minutes during 45 minutes while keeping the pH constant by continuous addition of 4M NaOH solution. The suspension in circulation through the microwave oven is kept at max 80° C. by suitable cooling. Then the product is filtered, dried and calcinated at 700° C.

under Ar for 2 hours. It results a silver-like yellowish powder. X-ray diffraction spectroscopy shows that the $TiO_2$ is present in the rutile modification

The invention claimed is:

1. A method of forming a rutile titanium dioxide-coated platelet-like pigment in which hydrous titanium dioxide is deposited on platelet-like particles, comprising
    (a) effecting the titanium deposit in the presence of an a-hydroxy carboxylic acid and an amino acid selected from the group consisting of alanine, phenylalanine, glycine, proline, cysteine, histidine, glutamine, leucine, isoleucine, arginine, lysine, serine, threonine, tryptophan, methionine, valine, tyrosine and asparagine,
    wherein the platelet-like particles have two flat and parallel surfaces with an aspect ratio length to thickness of from about 2:1 to about 1000:1 and a length to width ratio of from 3:1 to 1:1.

2. The method according to claim 1, comprising, in sequence,
    (a) contacting the platelet-like particles with a titanium salt and an a-hydroxy carboxylic acid and an amino acid containing coating bath at a low pH and coating the platelet-like particles with titanium dioxide in the hydrous form at acid pH by deposition from the titanium salt containing coating bath at a low pH.

3. The method according to claim 2, wherein the pH in step (a) is from 1.2 to 2.5.

4. The method according to claim 3, comprising in addition
    (b) removing the titanium dioxide coated particles from the coating bath and washing said particles to remove excess acid and impurities therefrom; and
    (c) calcining said particles at a temperature of from 500 to 1000° C. to produce a translucent coating of titanium dioxide in the rutile crystalline form thereon.

5. A method of forming a rutile titanium dioxide-coated platelet-like pigment according to claim 1 wherein the a-hydroxy carboxylic acid is selected from the group consisting of glycolic acid and oxalic acid, and the amino acid is selected from the group consisting of glycine, alanine, and valine.

* * * * *